United States Patent
Shimizu et al.

(10) Patent No.: US 11,231,435 B2
(45) Date of Patent: Jan. 25, 2022

(54) BRACKET FOR WHEEL SPEED SENSOR, AND WHEEL SPEED SENSOR

(71) Applicant: Sumitomo Wiring Systems, Ltd., Mie (JP)

(72) Inventors: Moriyuki Shimizu, Mie (JP); Hironobu Yamamoto, Mie (JP); Toshinari Kobayashi, Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 463 days.

(21) Appl. No.: 16/339,154

(22) PCT Filed: Sep. 25, 2017

(86) PCT No.: PCT/JP2017/034468
§ 371 (c)(1),
(2) Date: Apr. 3, 2019

(87) PCT Pub. No.: WO2018/070225
PCT Pub. Date: Apr. 19, 2018

(65) Prior Publication Data
US 2019/0257851 A1    Aug. 22, 2019

(30) Foreign Application Priority Data

Oct. 12, 2016    (JP) .............................. JP2016-200701

(51) Int. Cl.
*G01P 1/02*    (2006.01)
*F16B 39/02*    (2006.01)
(Continued)

(52) U.S. Cl.
CPC ............ *G01P 1/026* (2013.01); *F16B 39/025* (2013.01); *G01P 3/443* (2013.01); *G01P 3/488* (2013.01)

(58) Field of Classification Search
CPC ...... G01P 1/026; F16B 39/025; F16B 39/103; F16B 39/105; F16B 39/108; F16B 39/24
See application file for complete search history.

(56) References Cited

U.S. PATENT DOCUMENTS 4,941,769 A * 7/1990 Natsume ............... F16B 5/0241
403/377
5,996,408 A   12/1999 TenBrink et al.
(Continued)

FOREIGN PATENT DOCUMENTS

| JP | H8-170967 A | 7/1996 |
| JP | 2009-101912 A | 5/2009 |
| JP | 2011-091966 A | 5/2011 |

OTHER PUBLICATIONS

International Search Report, Application No. PCT/JP2017/034468, dated Dec. 19, 2017. ISA/Japan Patent Office.

*Primary Examiner* — Paul M. West
(74) *Attorney, Agent, or Firm* — Honigman LLP (57) ABSTRACT

The present disclosure provides a bracket for a wheel speed sensor, and a wheel speed sensor, which can be obtained at low cost and can prevent a bolt from loosening. A bracket capable of fixing a wheel speed sensor for detecting a wheel speed to a fixing portion of a vehicle includes: a main body portion made of synthetic resin through which an insertion hole that allows insertion of a bolt that is to be fixed to the fixing portion, and an attachment hole that allows insertion of a wheel speed sensor assembly are formed; and a collapsible portion that is provided along a circumferential direction of the insertion hole on a side opposite to the fixing portion, and that is collapsed in accordance with tightening of the bolt.

2 Claims, 10 Drawing Sheets

(51) Int. Cl.
    *G01P 3/44*     (2006.01)
    *G01P 3/488*    (2006.01)

(56) References Cited

U.S. PATENT DOCUMENTS 6,581,464 B1    6/2003   Anderson et al.
2017/0168080 A1  6/2017   Yamamoto

* cited by examiner

BRACKET FOR WHEEL SPEED SENSOR, AND WHEEL SPEED SENSOR

CROSS-REFERENCE TO RELATED APPLICATIONS

This application is the U.S. national stage of PCT/JP2017/034468 filed Sep. 25, 2017, which claims priority of Japanese Patent Application No. JP 2016-200701 filed Oct. 12, 2016, the contents of which are incorporated herein.

TECHNICAL FIELD

The present disclosure relates to a bracket for a wheel speed sensor, and a wheel speed sensor.

BACKGROUND

Conventionally, wheel speed sensors that are used to measure rotational speeds of wheels are attached to vehicles such as automobiles. For example, a wheel speed sensor described in JP 2015-141129A below includes a magnetoelectric transducer that converts a change in a magnetic field into an electrical signal and outputs the electrical signal from a lead terminal, and is fixed with a bolt to the vicinity of a rotor that rotates together with a wheel. In a state in which the wheel speed sensor is fixed to a vehicle, the upper face of the magnetoelectric transducer faces the rotor, and a change in a magnetic field caused by rotation of the rotor is detected.

The bolt for fixing the wheel speed sensor to the vehicle is inserted into an insertion hole of a bracket included in the wheel speed sensor, and is tightened. A tubular component made of metal is embedded in the bracket through insert molding, and the axial hole of the tubular component serves as a bolt insertion hole, and the end face in the axial direction of the tubular component serves as a bolt bearing surface. If the head of a bolt abuts against the bolt bearing surface only at a point, a sufficient contact area cannot be ensured, and the bolt may loosen. In that case, in order to prevent the bolt from loosening, the tightening torque has to be increased. A tubular component made of metal has high strength, and thus buckling is prevented even when the tightening torque is increased.

However, the above-described configuration in which a tubular component made of metal is formed through insert molding is problematic in that the cost is high. Furthermore, when the bolt bearing surface is corroded, a bolt may loosen.

The present disclosure was made in view of these circumstances, and it is an object thereof to provide a bracket for a wheel speed sensor, and a wheel speed sensor, which can be obtained at low cost and can prevent a bolt from loosening.

SUMMARY

The present disclosure is directed to a bracket for a wheel speed sensor for detecting a wheel speed, capable of fixing the wheel speed sensor to a fixing portion of a vehicle, including: a main body portion made of synthetic resin through which an insertion hole that allows insertion of a bolt that is to be fixed to the fixing portion, and an attachment hole that allows insertion of a wheel speed sensor assembly are formed; and a collapsible portion that is provided along a circumferential direction of the insertion hole on a side opposite to the fixing portion, and that is collapsed in accordance with tightening of the bolt, wherein a plurality of hole portions are provided along the circumferential direction of the insertion hole, and the collapsible portion includes a first collapsible portion that is left between the hole portions that are adjacent to each other in the circumferential direction of the insertion hole, and a second collapsible portion that is left in a shape of a ring between a circumferential edge of the insertion hole and the hole portions.

The present disclosure is also directed to a wheel speed sensor including: the above-described bracket; and a wheel speed sensor assembly, wherein the wheel speed sensor assembly is molded with resin in the attachment hole of the bracket.

Advantageous Effects of Disclosure

According to the present disclosure, when a collapsible portion is collapsed, a contact area between a bolt bearing surface and a head of a bolt can be reliably ensured, and thus it is possible to prevent the bolt from loosening, with a small tightening torque. Accordingly, it is not necessary to form a tubular component made of metal through insert molding in order to ensure the strength, and, furthermore, it is possible to prevent a bolt from loosening due to corrosion of a bearing surface because a tubular component made of metal is not used. That is to say, the configuration of the present disclosure can be obtained at low cost and can prevent a bolt from loosening.

DETAILED DESCRIPTION OF PREFERRED EMBODIMENTS

Hereinafter, preferred modes of the present disclosure will be described.

Example 1

Hereinafter, Example 1 that can be used as a reference when embodying the present disclosure will be described in detail with reference to FIGS. 1 to 5.

Figure 2:
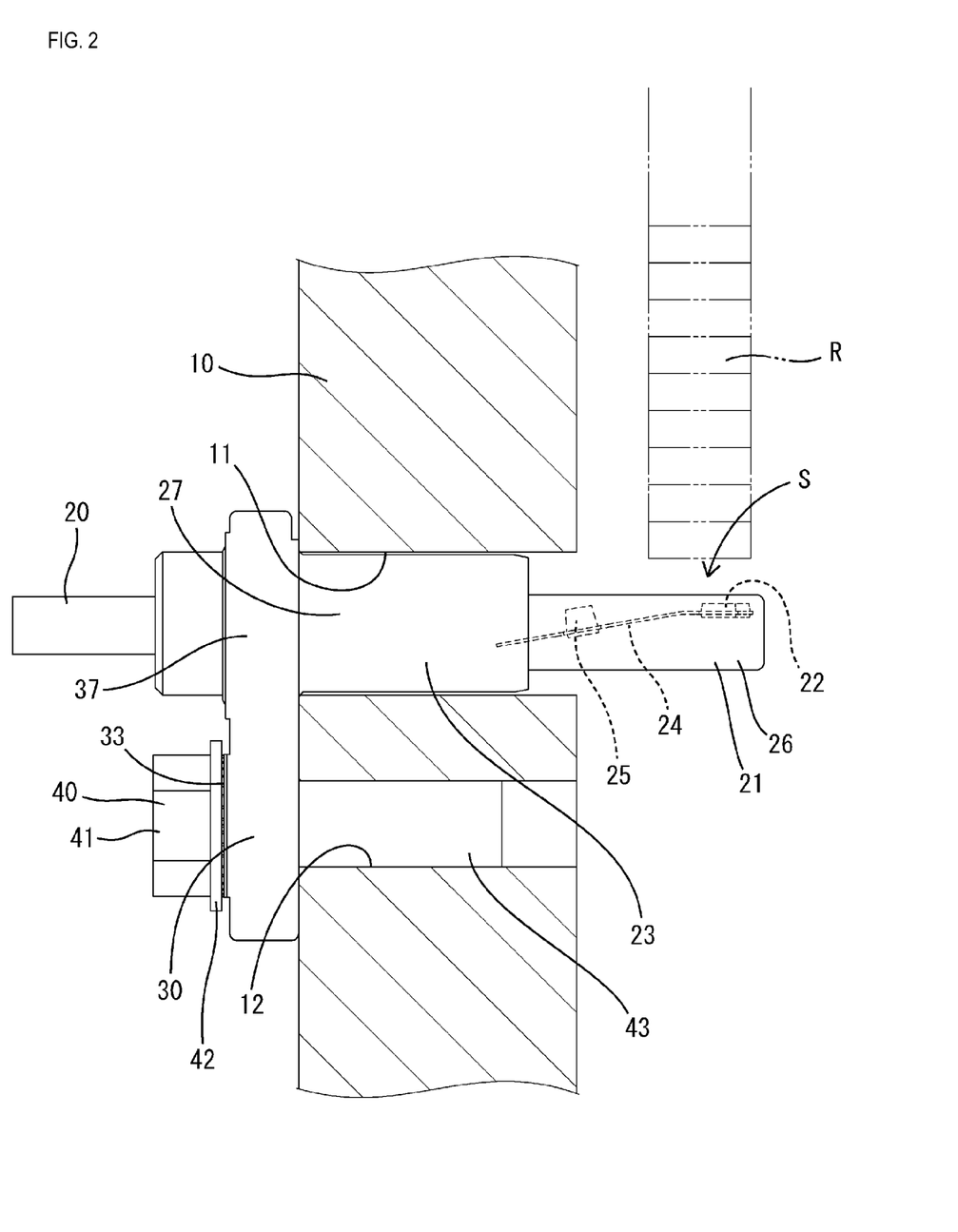
FIG. 2 is a cross-sectional view showing the wheel speed sensor that has been fixed to a fixing portion.
Figure 3:
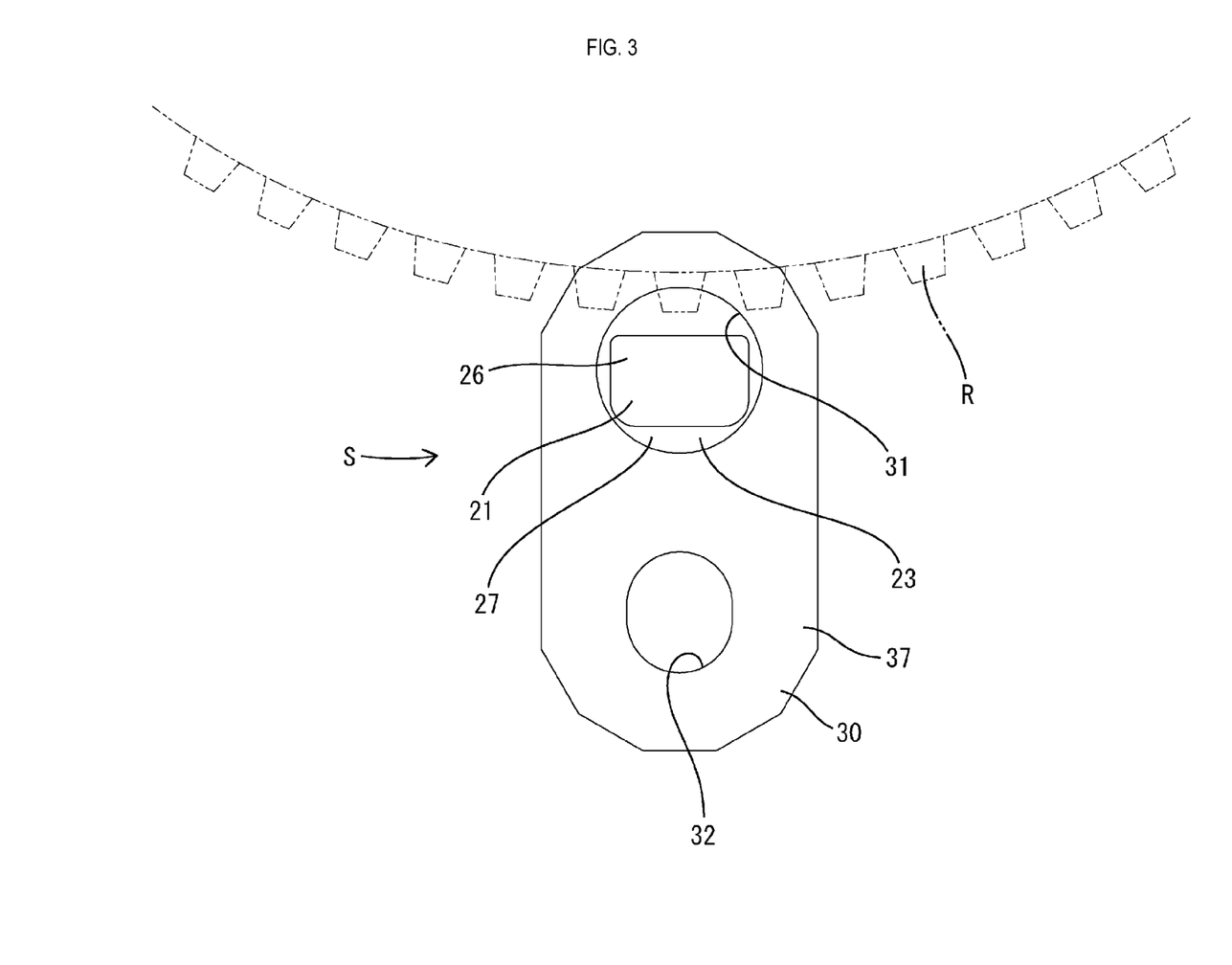
FIG. 3 is a schematic view schematically showing a positional relationship between a rotor and the wheel speed sensor.

A wheel speed sensor S in this example is an in-vehicle sensor that is attached to a vehicle, and is particularly used to measure a wheel speed. As shown in FIGS. 2 and 3, the wheel speed sensor S is fixed to a fixing portion 10 of a vehicle so as to face a rotor R that rotates in one piece with a wheel of the vehicle. The wheel speed sensor S is used to accurately measure a rotational speed of a wheel, for example, as part of an antilock brake system (ABS) for preventing the wheels from locking up during braking.

The wheel speed sensor S includes a sensor component 21 connected to a wire harness 20, and a bracket 30 attached to the sensor component 21.

The wire harness 20 is configured as a single cable by bundling unshown two electric wires and coating the bundle with a resin or the like. Each electric wire of the wire harness 20 is constituted by a conductive material coated with an insulating coating, and, at an end portion thereof, the insulating coating is removed and the exposed conductive material is electrically connected to the sensor component 21.

The sensor component 21 includes a detecting element 22 that is connected to an end portion the wire harness 20, and an exterior portion 23 that seals the detecting element 22 with resin.

The detecting element 22 is an element that converts a change in a magnetic field into an electrical signal and outputs the electrical signal from lead terminals 24, and is substantially in the shape of a rectangular plate. The lead terminals 24 are constituted by two terminals extending substantially in parallel with each other from one side face of the detecting element 22, and a capacitor 25 substantially in the shape of a rectangular solid is connected to the two lead terminals 24 so as to cross over the lead terminals 24. Furthermore, the conductive materials exposed at the end portions of the electric wires are connected to the two lead terminals 24 through soldering or the like.

In a state in which the wheel speed sensor S is fixed to the fixing portion 10, as shown in FIG. 2, the upper face of the detecting element 22 faces the rotor R that is to be detected. The detecting element 22 of this example is configured as a Hall IC accommodating a Hall effect sensor, which is a magnetoelectric transducer that converts a change in a magnetic field into an electrical signal and outputs the electrical signal from the lead terminals 24, and a signal conversion circuit.

The exterior portion 23 is made of synthetic resin, and seals with resin the entirety of the detecting element 22 and the connecting portion of the detecting element 22 and the wire harness 20. The detecting element 22 and the connecting portion of the detecting element 22 and the wire harness 20 are enclosed by the exterior portion 23 in a state of being held by a holder portion (not shown) made of synthetic resin.

Figure 1:
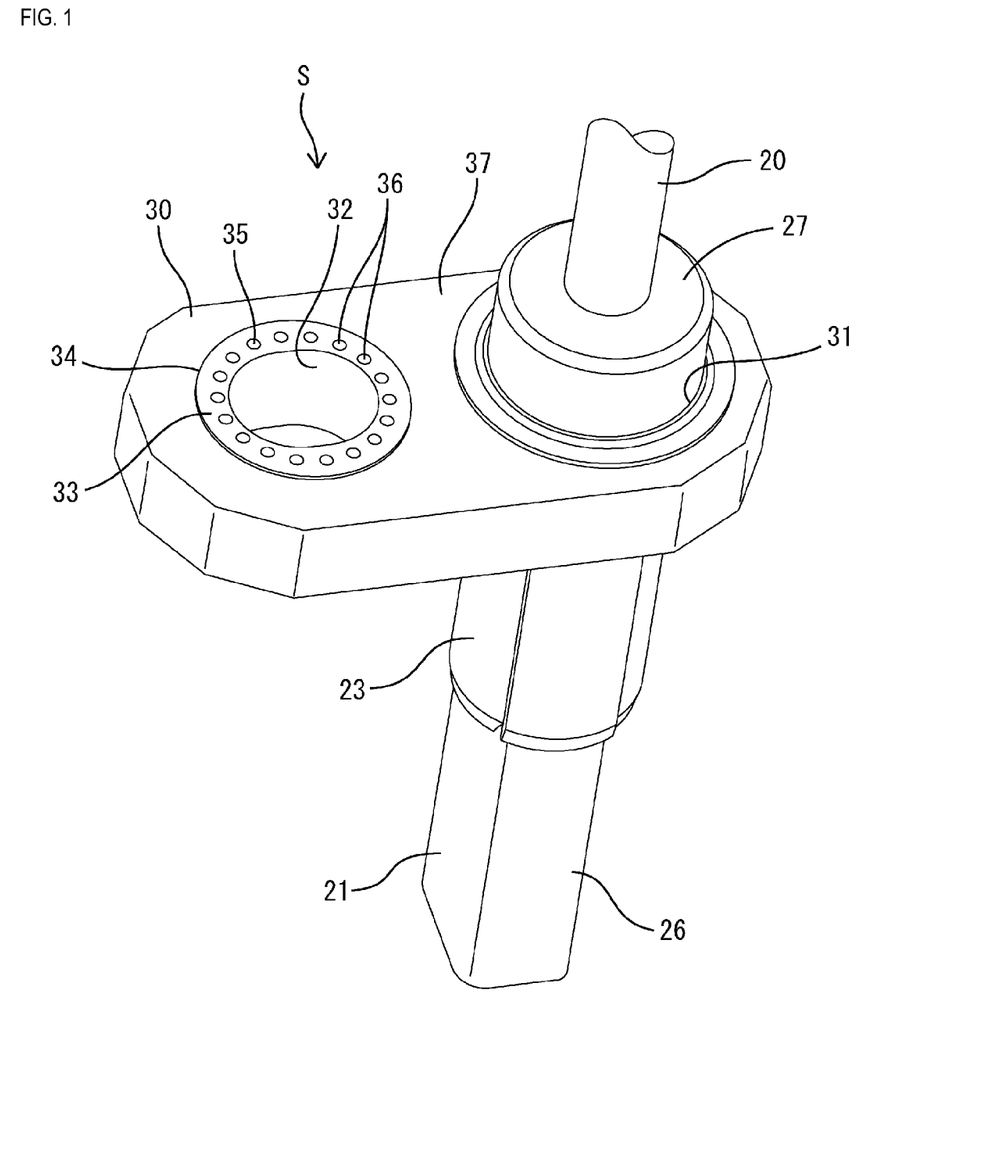
FIG. 1 is a perspective view showing a wheel speed sensor according to Example 1.

As shown in FIG. 1, the exterior portion 23 is, as a whole, in the shape of a bar that is long in the extending direction of the wire harness 20, and coats the entirety from the end portion of the wire harness 20 to the front end of the detecting element 22. The front portion (hereinafter, referred to as an exterior front portion 26) of the exterior portion 23 is in the shape of a quadratic prism, and the rear portion (hereinafter, referred to as an exterior rear portion 27) is in the shape of a solid cylinder. A large portion of the detecting element 22 is embedded in the exterior front portion 26, and the end portion of the wire harness 20 is embedded in the exterior rear portion 27. Furthermore, the exterior rear portion 27 is inserted into and fixed to an attachment hole 31 of the bracket 30.

The bracket 30 includes a main body portion 37 made of synthetic resin. The main body portion 37 is, as a whole, substantially in the shape of an elongated circular plate that is slightly long in one direction.

The attachment hole 31 that allows insertion and attachment of the sensor component 21 is formed at one end portion in the longitudinal direction of the main body portion 37. The attachment hole 31 is substantially in the shape of a circle, and is formed through the main body portion 37 in the plate thickness direction. The bracket 30 is in one piece with the sensor component 21 that has been inserted into the attachment hole 31.

Figure 5:
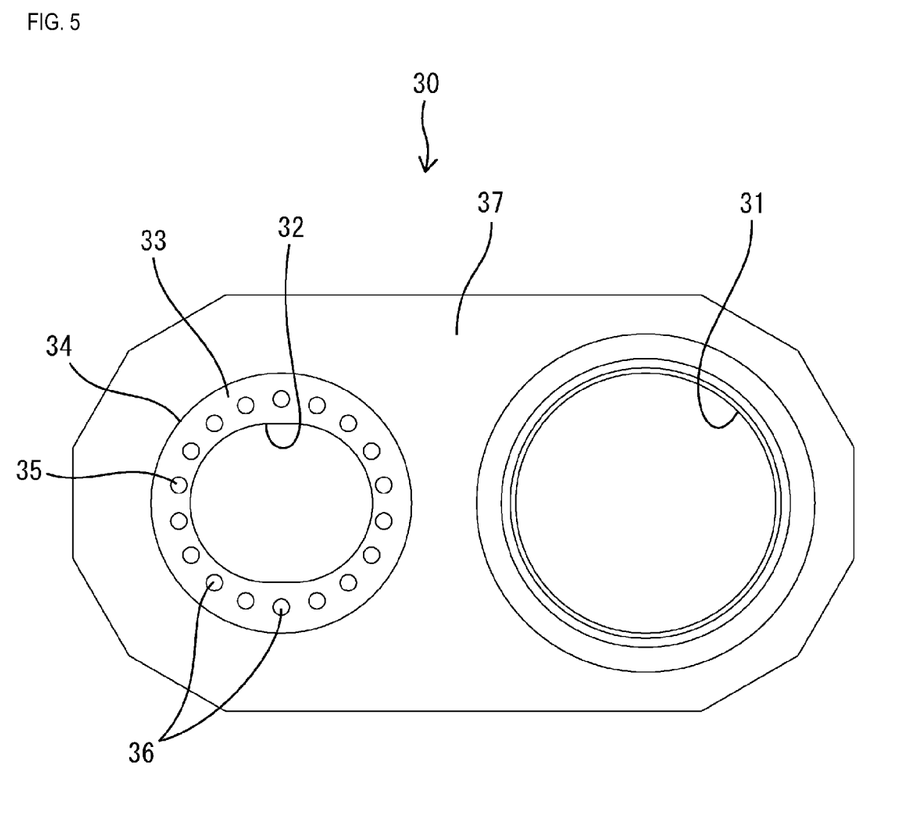
FIG. 5 is a plan view showing the bracket.

An insertion hole 32 that allows insertion of a bolt 40 for fixing the bracket 30 to a vehicle is formed at the other end portion in the longitudinal direction of the main body portion 37. As shown in FIG. 5, the insertion hole 32 is substantially in the shape of a circle that is slightly long in the longitudinal direction of the main body portion 37, and is formed through the main body portion 37 in the plate thickness direction. The wheel speed sensor S is inserted into the insertion hole 32 of the bracket 30 and is fixed with a bolt to an appropriate point (the fixing portion 10) in a vehicle.

Figure 4:
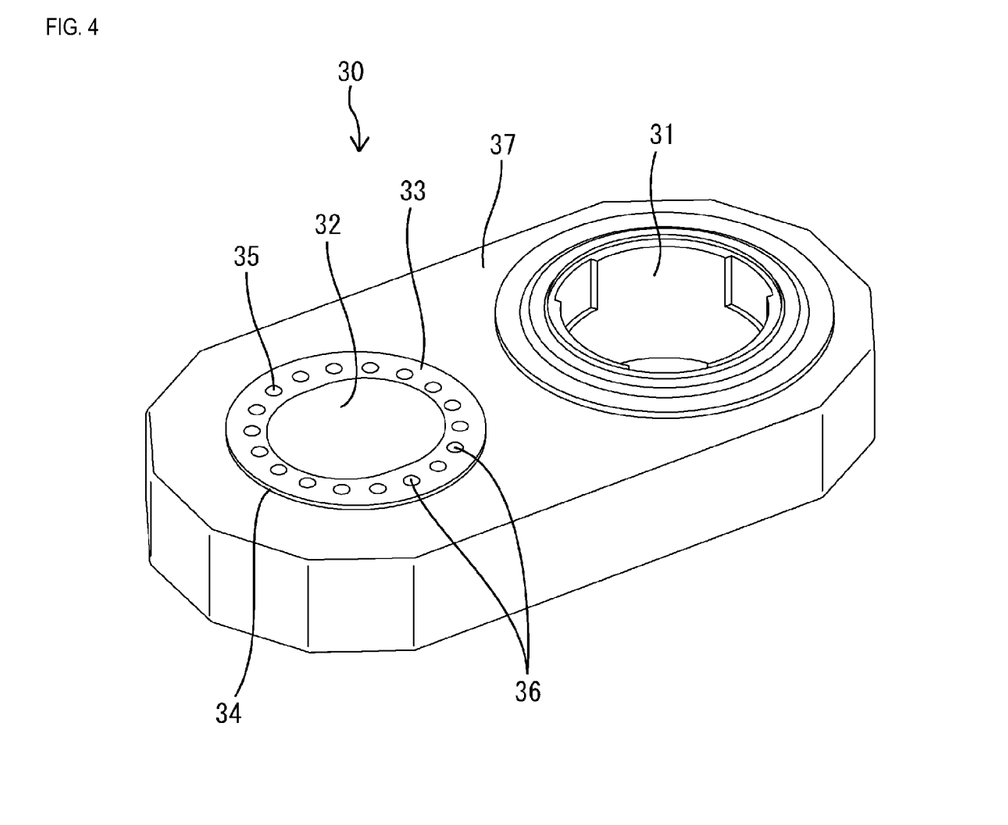
FIG. 4 is a perspective view showing a bracket.

A bearing surface 33 for the bolt 40 is formed around the insertion hole 32. As shown in FIG. 4, the bearing surface 33 slightly projects from the other portions of the plate face of the main body portion 37, and is in the shape of a flat face. The bearing surface 33 is formed around the insertion hole 32 in the shape of a ring that is slightly smaller than a washer 42 of the bolt 40. As shown in FIG. 5, an outer circumferential edge 34 of the bearing surface 33 is substantially in the shape of a perfect circle, and the bearing surface 33 has a substantially constant width dimension (dimension in the radial direction of the insertion hole 32) around the entire circumference.

Collapsible portions 35, which are collapsed in accordance with the tightening of the bolt 40, are provided on the bearing surface 33 along the circumferential direction of the insertion hole 32. The collapsible portions 35 are constituted by a plurality of small protrusions 36, and are formed substantially at equal intervals along the circumferential direction around the entire circumference of the bearing surface 33. The protrusions 36 each extend upward in the shape of a dome, and are dots that are arranged substantially in a circular form in plan view. The collapsible portions 35 are provided at the center in the width direction (the radial direction of the insertion hole 32) of the bearing surface 33, and are arranged as a single ring in plan view. The collapsible portions 35 are positioned closer to the inner circumference (the insertion hole 32) than the outer circumferential edge 34 of the bearing surface 33 is by a constant distance.

Next, an example of a method for producing the wheel speed sensor S in this example will be described.

First, the detecting element 22 is positioned and accommodated in a mold for primary molding, synthetic resin is poured into the mold and cured, so that a holder portion for holding the detecting element 22 in one piece with the detecting element 22 is molded. Next, the conductive materials of the electric wires of the wire harness 20 are connected to the lead terminals 24 of the detecting element 22.

Furthermore, the bracket 30 is produced separately.

Next, the holder portion holding the detecting element 22 and the end portion of the wire harness 20, and the bracket 30 are positioned and accommodated in a mold for secondary molding, synthetic resin is poured into the mold and cured, so that the exterior portion 23 is molded. At this time, the end portion of the wire harness 20 is set so as to extend through the attachment hole 31 of the bracket 30. The molded exterior portion 23 is in close contact and in one piece with the circumferential face of the attachment hole 31 of the bracket 30, and thus the bracket 30 and the sensor component 21 are integrated.

Thus, the production of the wheel speed sensor S is completed.

Next, an example of an operation that fixes the wheel speed sensor S in this example to the fixing portion 10 will be described.

First, as shown in FIG. 2, the sensor component 21 is inserted into an insertion hole 11 of the fixing portion 10, and the insertion hole 32 of the bracket 30 is positioned at a fixing hole 12 of the fixing portion 10, so that one face (face on the side opposite to the bearing surface 33) of the bracket 30 abuts against the fixing portion 10. In this state, the front end portion of the sensor component 21 projects from the insertion hole 11, and faces the rotor R.

Next, the bolt 40 is inserted into the insertion hole 32 of the bracket 30, and is tightened. A shank 43 of the bolt 40 is screwed from the insertion hole 32 into the fixing hole 12 and is tightened. Thus, a head 41 (the washer 42) of the bolt 40 comes into contact with the collapsible portions 35 of the bearing surface 33 of the bracket 30, and gradually collapses the collapsible portions 35. Even in the case in which the head 41 (the washer 42) of the bolt 40 is in contact with only some of the collapsible portions 35 before tightening, the pressure of the head 41 (the washer 42) of the bolt 40 increases in accordance with the tightening, and thus the collapsible portions 35 are gradually collapsed, and, in the course of time, the head 41 (the washer 42) of the bolt 40 comes into contact with substantially all collapsible portions 35. Accordingly, substantially all collapsible portions 35 are in close contact with the head 41 (the washer 42) of the bolt 40.

Thus, the operation that fixes the wheel speed sensor S is completed.

Next, the actions and effects of examples with the above-described configuration will be described.

The bracket 30 of the wheel speed sensor S in this example includes the main body portion 37 made of synthetic resin through which the insertion hole 32 that allows insertion of the bolt 40 that is to be fixed to the fixing portion 10 is formed, and the collapsible portions 35, which are collapsed in accordance with the tightening of the bolt 40, are provided on the bearing surface 33 for the bolt 40 along the circumferential direction of the insertion hole 32.

With this configuration, when the collapsible portions 35 are collapsed, the contact area between the bearing surface 33 for the bolt 40 and the head 41 of the bolt 40 is reliably ensured, and thus it is possible to prevent the bolt 40 from loosening, with a small tightening torque. Thus, it is not necessary to form a tubular component made of metal through insert molding in order to ensure the strength, and, furthermore, it is possible to prevent the bolt 40 from loosening due to corrosion of the bearing surface 33 because a tubular component made of metal is not used. That is to say, the configuration of this example can be obtained at low cost and can prevent the bolt 40 from loosening.

Example 2

Figure 6:
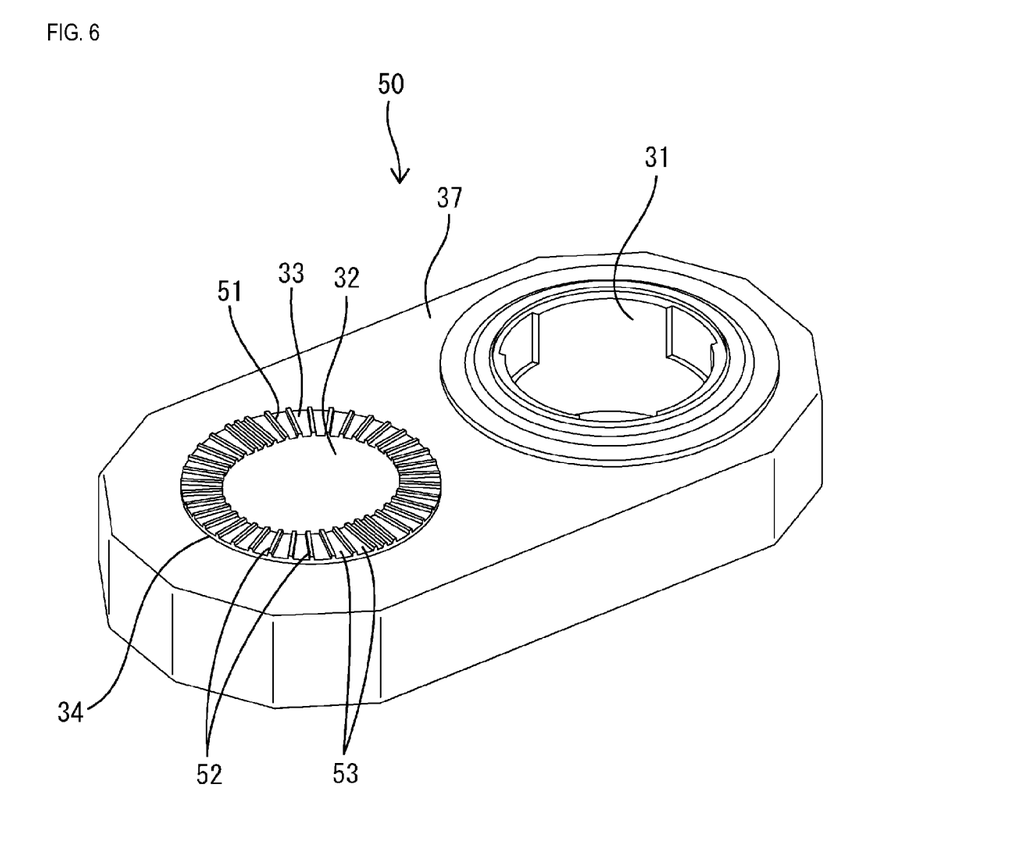
FIG. 6 is a perspective view showing a bracket according to Example 2.
Figure 7:
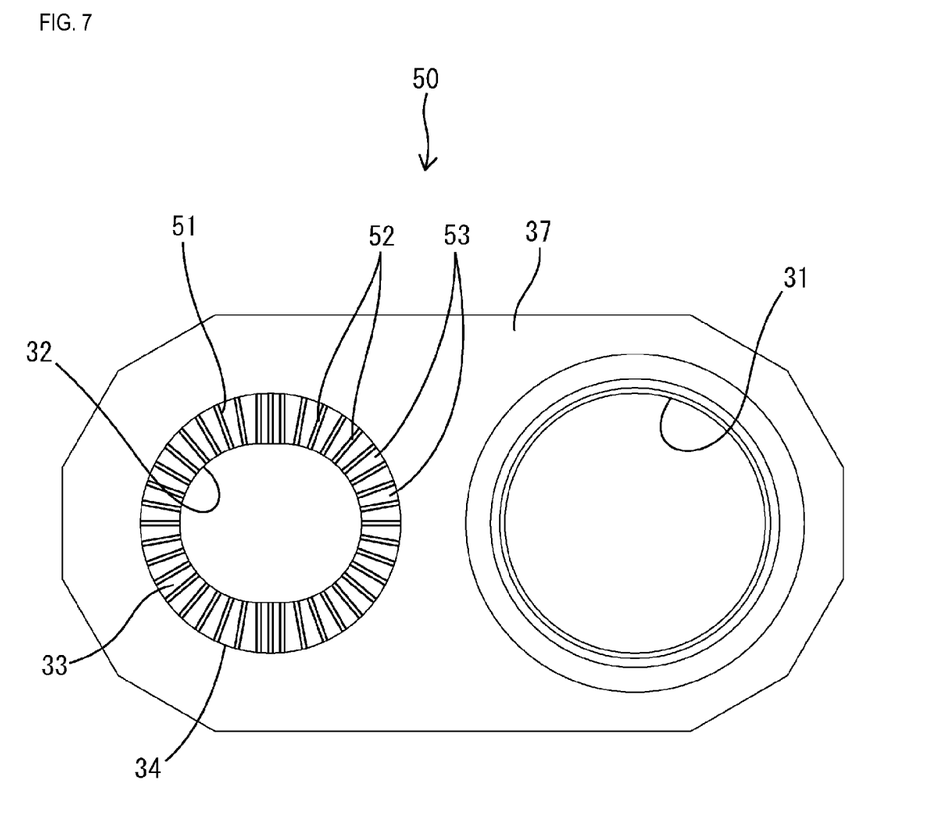
FIG. 7 is a plan view showing the bracket.

Next, the wheel speed sensor S according to Example 2 that can be used as a reference when embodying the present disclosure will be described with reference to FIGS. 6 and 7.

The wheel speed sensor S of this example is different from Example 1 in that the shape of a collapsible portions 51 of a bracket 50 is different. Note that the constituent elements similar to those in Example 1 are denoted by the same reference numerals and a description thereof will not be repeated.

As in Example 1, the wheel speed sensor S of this example includes the bracket 50 made of synthetic resin that is to be fixed to the fixing portion 10, the insertion hole 32 that allows insertion of the bolt 40 is formed through the bracket 50, and the collapsible portions 51, which are collapsed in accordance with the tightening of the bolt 40, are provided on the bearing surface 33 for the bolt 40 along the circumferential direction of the insertion hole 32.

The collapsible portions 51 are constituted by a plurality of small protrusions 52, and are formed substantially at equal intervals along the circumferential direction around the entire circumference of the bearing surface 33. The protrusions 52 are each in the shape of an elongated rib extending in the radial direction of the insertion hole 32, and are radially arranged extending from the center of the insertion hole 32 in all directions in plan view. The protrusions 52 extend over the entire width of the bearing surface 33, that is, extend between the inner circumferential edge (the insertion hole 32) of the bearing surface 33 and the outer circumferential edge 34. Elongated grooves 53 in which the bearing surface 33 serves as the bottom face are formed between adjacent protrusions 52.

As described above, in this example, the collapsible portions 51, which are collapsed in accordance with the tightening of the bolt 40, are provided on the bearing surface 33 of the bracket 50 for the bolt 40 as in Example 1, and thus, when the collapsible portions 51 are collapsed, the contact area between the bearing surface 33 for the bolt 40 and the head 41 of the bolt 40 is reliably ensured. Accordingly, it is possible to prevent the bolt 40 from loosening, with a small tightening torque, and thus it is not necessary to form a tubular component made of metal through insert molding in order to ensure the strength, and, furthermore, it is possible to prevent the bolt 40 from loosening due to corrosion of the bearing surface 33 because a tubular component made of metal is not used.

Example 3

Figure 8:
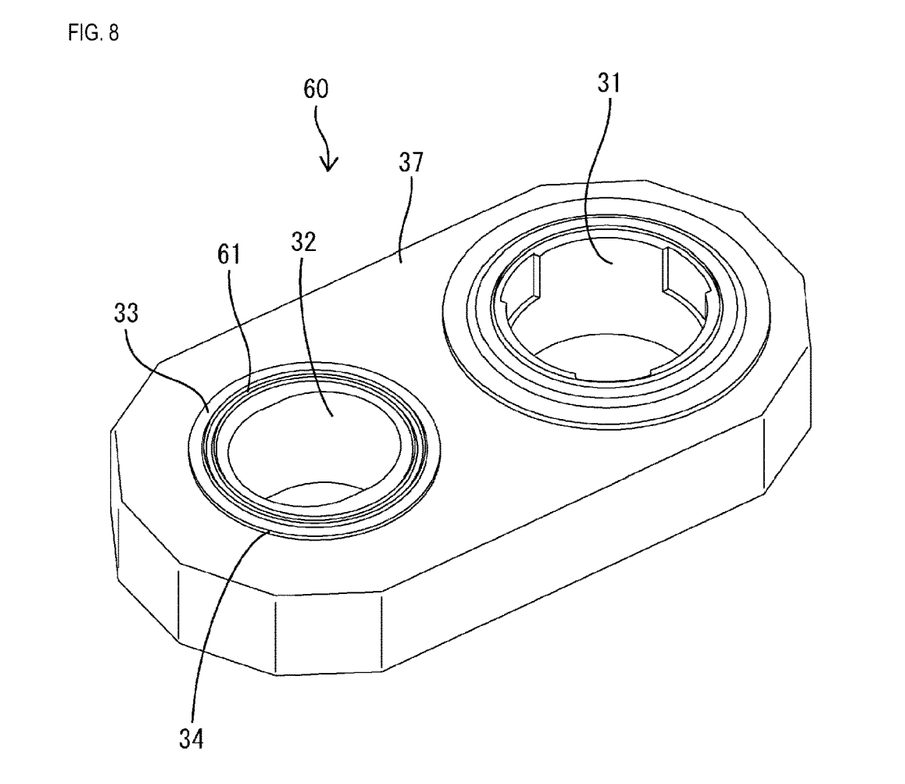
FIG. 8 is a perspective view showing a bracket according to Example 3.
Figure 9:
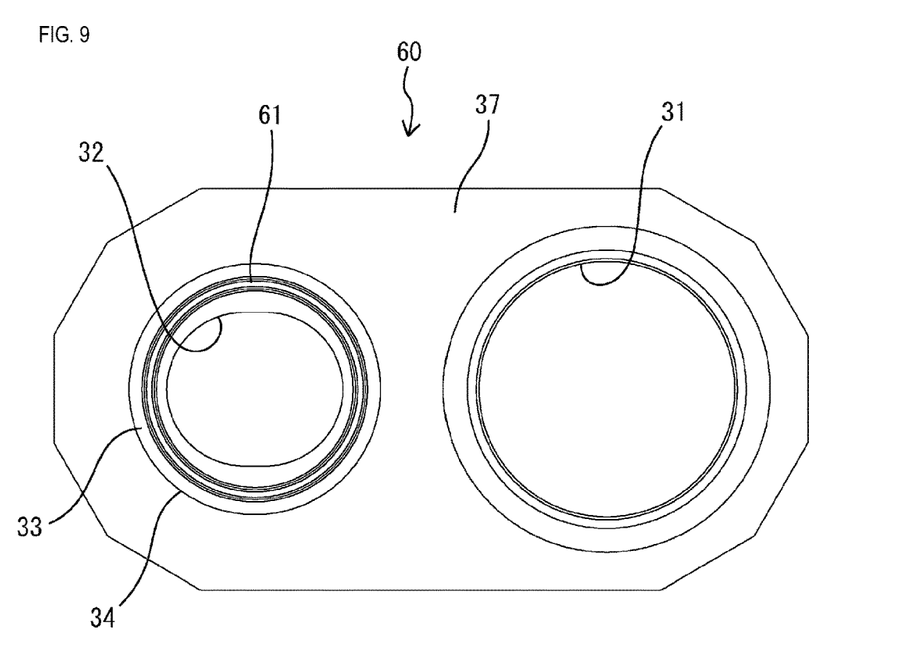
FIG. 9 is a plan view showing the bracket.

Next, the wheel speed sensor S according to Example 3 that can be used as a reference when embodying the present disclosure will be described with reference to FIGS. 8 and 9.

The wheel speed sensor S of this example is different from Example 1 in that the shape of a collapsible portion 61 of a bracket 60 is different. Note that the constituent elements similar to those in Example 1 are denoted by the same reference numerals and a description thereof will not be repeated.

As in Example 1, the wheel speed sensor S of this example includes the bracket 60 made of synthetic resin that is to be fixed to the fixing portion 10, the insertion hole 32 that allows insertion of the bolt 40 is formed through the bracket 60, and the collapsible portion 61, which is collapsed in accordance with the tightening of the bolt 40, is provided on the bearing surface 33 for the bolt 40 along the circumferential direction of the insertion hole 32.

The collapsible portion 61 is in the shape of a projecting elongated rib extending in the circumferential direction of the bearing surface 33. The collapsible portion 61 is formed continuously around the entire circumference of the bearing surface 33. The collapsible portion 61 is provided at the center in the width direction (the radial direction of the insertion hole 32) of the bearing surface 33, and is arranged as a single ring in plan view. The collapsible portion 61 is positioned closer to the inner circumference (the insertion hole 32) than the outer circumferential edge 34 of the bearing surface 33 is by a constant distance, and is substantially in parallel with the outer circumferential edge 34 of the bearing surface 33.

As described above, in this example, the collapsible portion 61, which is collapsed in accordance with the tightening of the bolt 40, is provided on the bearing surface 33 of the bracket 60 for the bolt 40 as in Example 1, and thus, when the collapsible portion 61 is collapsed, the contact area between the bearing surface 33 for the bolt 40 and the head 41 of the bolt 40 is reliably ensured. Accordingly, it is possible to prevent the bolt 40 from loosening, with a small tightening torque, and thus it is not necessary to form a tubular component made of metal through insert molding in order to ensure the strength, and, furthermore, it is possible to prevent the bolt 40 from loosening due to corrosion of the bearing surface 33 because a tubular component made of metal is not used.

Example 4

Figure 10:
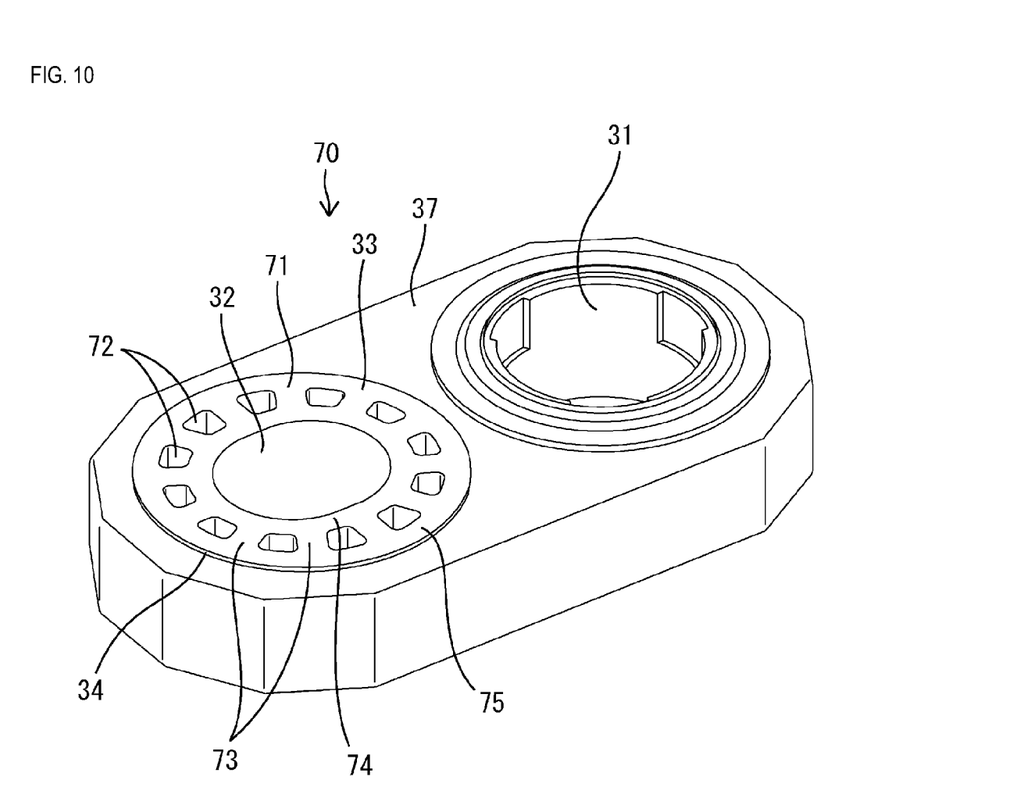
FIG. 10 is a perspective view showing a bracket according to Example 4.
Figure 11:
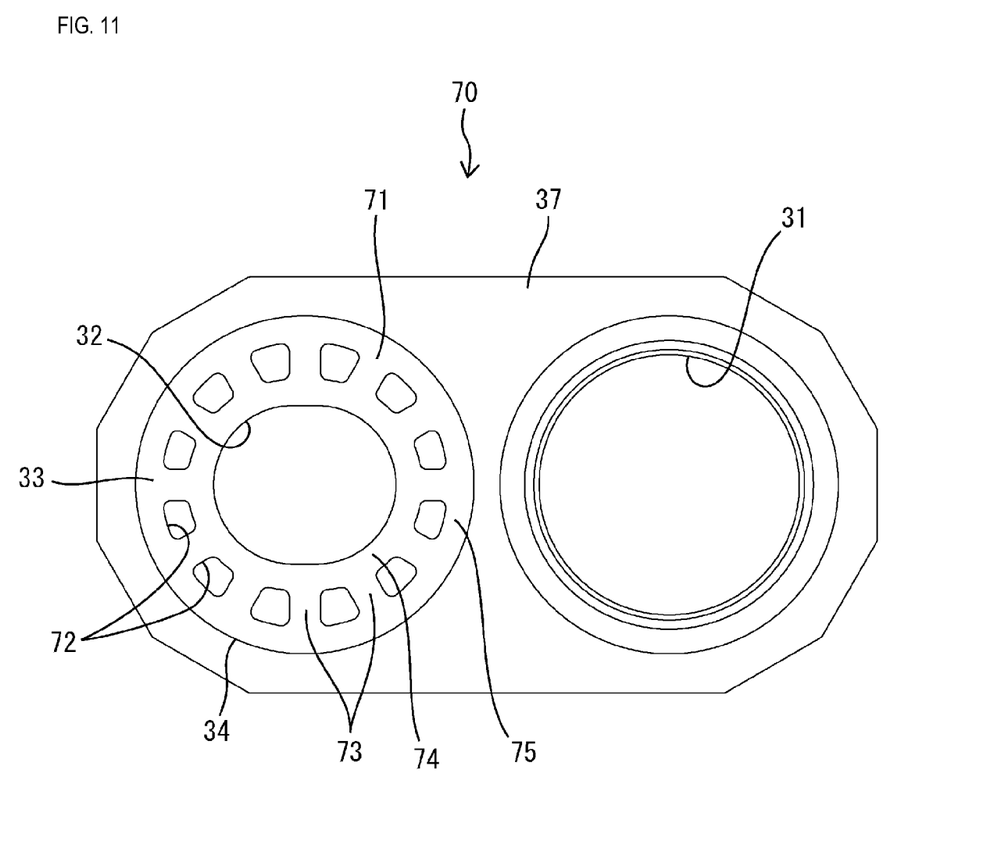
FIG. 11 is a plan view showing the bracket.

Next, the wheel speed sensor S according to Example 4 embodying the present disclosure will be described with reference to FIGS. 10 and 11.

The wheel speed sensor S of this example is different from Example 1 in that the shape of a collapsible portion 71 of a bracket 70 is different. Note that the constituent elements similar to those in Example 1 are denoted by the same reference numerals and a description thereof will not be repeated.

As in Example 1, the wheel speed sensor S of this example includes the bracket 70 made of synthetic resin that is to be fixed to the fixing portion 10, the insertion hole 32 that allows insertion of the bolt 40 is formed through the bracket 70, and the collapsible portion 71, which is collapsed in accordance with the tightening of the bolt 40, is provided on the bearing surface 33 for the bolt 40 along the circumferential direction of the insertion hole 32.

The collapsible portion 71 is a portion that is located between a plurality of hole portions 72 formed on the bearing surface 33 for the bolt 40. The plurality of hole portions 72 are formed substantially at equal intervals along the circumferential direction around the entire circumference of the bearing surface 33. The hole portions 72 are each substantially in the shape of a quadrangle in plan view, and all hole portions 72 have substantially the same shape. The hole portions 72 are each in the shape of a trapezoid whose side on the outer circumferential side is longer than and substantially in parallel with the side on the inner circumferential side in plan view. Note that, among the plurality of hole portions 72, those that are arranged at positions facing the widthwise direction of the insertion hole 32 have a height dimension (dimension in the radial direction of the insertion hole 32) slightly larger than a height dimension of those that are arranged at positions facing the longitudinal direction.

The collapsible portion 71 includes portions (hereinafter, referred to as first collapsible portions 73) of the bearing surface 33 that are located between adjacent hole portions 72 along the circumferential direction of the insertion hole 32, a portion (hereinafter, referred to as a second collapsible portion 74) of the bearing surface 33 that is along the inner circumferential edge (the circumferential edge of the insertion hole 32), and a portion (hereinafter, referred to as a third collapsible portion 75) that is along the outer circumferential edge 34.

The first collapsible portions 73 are formed substantially at equal intervals along the circumferential direction around the entire circumference of the bearing surface 33. The first collapsible portions 73 are provided at the center in the width direction (the radial direction of the insertion hole 32) of the bearing surface 33, and are each in the shape of a quadrangle in plan view.

The second collapsible portion 74 is formed continuously around the entire circumference of the inner circumferential edge of the bearing surface 33, and the third collapsible portion 75 is formed continuously around the entire circumference of the outer circumferential edge 34 of the bearing surface 33. The width dimension (dimension in the circumferential direction of the insertion hole 32) of the first collapsible portions 73 is, as a whole, similar to the width dimension (dimension in the radial direction of the insertion hole 32) of the second collapsible portion 74 and the third collapsible portion 75.

As described above, in this example, the collapsible portion 71, which is collapsed in accordance with the tightening of the bolt 40, is provided on the bearing surface 33 of the bracket 70 for the bolt 40 as in Example 1, and thus, when the collapsible portion 71 is collapsed, the contact area between the bearing surface 33 for the bolt 40 and the head 41 of the bolt 40 is reliably ensured. Accordingly, it is possible to prevent the bolt 40 from loosening, with a small tightening torque, and thus it is not necessary to form a tubular component made of metal through insert molding in order to ensure the strength, and, furthermore, it is possible to prevent the bolt 40 from loosening due to corrosion of the bearing surface 33 because a tubular component made of metal is not used.

OTHER EXAMPLES

The present disclosure is not limited to the foregoing description and the examples that have been described with reference to the drawings, and, for example, examples as described below are also embraced within the technical scope of the present disclosure.

In the examples above, the bracket 30 and the sensor component 21 are integrated when molding the exterior portion 23, but there is no limitation to this, and, for example, they may be integrated by inserting the sensor component through the insertion hole of the bracket and assembling them, or the bracket may be molded together with the exterior portion.

In Example 1 above, the protrusions 36 constituting the collapsible portions 35 are each in the shape of a dome, but there is no limitation to this, and, for example, they may be each in the shape of a pyramid.

In Examples 1 and 3 above, the collapsible portions 35 (61) are arranged as a single ring in plan view, but there is no limitation to this, and, for example, the collapsible portions may be arranged as a double ring.

In Example 3 above, the collapsible portion 61 is formed continuously around the entire circumference of the bearing surface 33, but there is no limitation to this, and the collapsible portion may be intermittently formed along the circumferential direction of the bearing surface.

The invention claimed is:
1. A bracket for a wheel speed sensor for detecting a wheel speed, capable of fixing the wheel speed sensor to a fixing portion of a vehicle, comprising:
 a main body portion made of synthetic resin through which an insertion hole that allows insertion of a bolt that is to be fixed to the fixing portion, and an attachment hole that allows insertion of a wheel speed sensor assembly are formed; and a collapsible portion that is provided along a circumferential direction of the insertion hole on a side opposite to the fixing portion, and that is collapsed in accordance with tightening of the bolt,
wherein a plurality of hole portions are provided along the circumferential direction of the insertion hole, and the collapsible portion includes a first collapsible portion that is left between the hole portions that are adjacent to each other in the circumferential direction of the insertion hole, and a second collapsible portion that is left in a shape of a ring between a circumferential edge of the insertion hole and the hole portions.

2. A wheel speed sensor comprising:
the bracket according to claim 1; and
a wheel speed sensor assembly,
wherein the wheel speed sensor assembly is molded with resin in the attachment hole of the bracket.

\* \* \* \* \*